United States Patent
Ide et al.

(10) Patent No.: US 9,500,148 B2
(45) Date of Patent: Nov. 22, 2016

(54) CONTROL DEVICE AND CONTROL METHOD USED FOR ENGINE INTAKE AIR-OR-GAS SYSTEM

(75) Inventors: Kazunari Ide, Tokyo (JP); Ko Takayanagi, Tokyo (JP); Hiroyoshi Kubo, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 860 days.

(21) Appl. No.: 13/388,156

(22) PCT Filed: Jan. 13, 2011

(86) PCT No.: PCT/JP2011/050473
§ 371 (c)(1),
(2), (4) Date: Jan. 31, 2012

(87) PCT Pub. No.: WO2011/093141
PCT Pub. Date: Aug. 4, 2011

(65) Prior Publication Data
US 2012/0130623 A1    May 24, 2012

(30) Foreign Application Priority Data
Jan. 27, 2010   (JP) .................. 2010-015900

(51) Int. Cl.
*F02D 41/00* (2006.01)
*F02D 35/00* (2006.01)
(Continued)

(52) U.S. Cl.
CPC ....... *F02D 41/0077* (2013.01); *F02D 35/0007* (2013.01); *F02D 41/0002* (2013.01);
(Continued)

(58) Field of Classification Search
CPC .............. F02D 35/0007; F02D 41/0077; F02D 41/221; F02D 2011/108; Y02T 10/42; Y02T 10/47
(Continued)

(56) References Cited

U.S. PATENT DOCUMENTS 2,313,090 A * 3/1943 Reiser .................... F16K 5/225
137/246.14
2,746,711 A * 5/1956 Kenney ............... F16K 31/1221
251/26
(Continued)

FOREIGN PATENT DOCUMENTS

DE    103 54 470    6/2005
EP    0 837 237 A2   4/1998
(Continued)

OTHER PUBLICATIONS

International Search Report issued Feb. 15, 2011 in corresponding International Application No. PCT/JP2011/050473.
(Continued)

*Primary Examiner* — Stephen K Cronin
*Assistant Examiner* — Brian Kirby
(74) *Attorney, Agent, or Firm* — Wenderoth, Lind & Ponack, L.L.P.

(57) ABSTRACT

A control device of a control valve used for an intake air-gas system of an engine. The device includes, but is not limited to: the control valve which is an intake air throttle valve provided in the intake air-gas system provided in the intake air-gas system of the engine to control the flow rate of intake air to the engine, or an EGR valve provided in the intake air-gas system of the engine to control the flow rate of EGR gas to the engine; and a control unit which determines a target opening of the control valve in response to the operation conditions of the engine, and controls the opening
(Continued)

of the control valve so that the opening conforms with the target opening.

8 Claims, 8 Drawing Sheets

(51) Int. Cl.
*F02D 41/22* (2006.01)
*F02D 41/14* (2006.01)

(52) U.S. Cl.
CPC ......... *F02D 41/221* (2013.01); *F02D 41/0052* (2013.01); *F02D 2041/1409* (2013.01); *F02M 26/05* (2016.02); *F02M 26/22* (2016.02); *F02M 26/23* (2016.02); *Y02T 10/42* (2013.01); *Y02T 10/47* (2013.01)

(58) Field of Classification Search
USPC ............ 123/568.16, 568.19, 568.24, 339.15, 123/361, 399, 568.21, 690, 396, 397, 398; 701/105, 107, 108, 114; 73/114.31–114.37, 114.74
See application file for complete search history.

(56) References Cited

U.S. PATENT DOCUMENTS

| | | | | |
|---|---|---|---|---|
| 3,327,554 | A * | 6/1967 | Searles | B60K 17/10 477/118 |
| 4,309,022 | A * | 1/1982 | Reinicke | F16K 31/1221 251/297 |
| 4,592,322 | A * | 6/1986 | Murakami | F02D 11/105 123/361 |
| 5,675,080 | A * | 10/1997 | Wada | F01P 11/14 123/568.16 |
| 5,676,217 | A * | 10/1997 | Torii | B60K 31/047 180/171 |
| 5,771,869 | A * | 6/1998 | Yoshihara | F02M 26/49 123/568.16 |
| 5,937,941 | A * | 8/1999 | Gach | B60H 1/00735 165/202 |
| 5,947,086 | A * | 9/1999 | Hoshino | F02D 11/105 123/396 |
| 6,047,679 | A * | 4/2000 | Matsumoto | F02D 11/107 123/396 |
| 6,073,610 | A * | 6/2000 | Matsumoto | F02D 11/107 123/396 |
| 6,186,115 | B1 * | 2/2001 | Nishimura | F02D 9/10 123/337 |
| 6,199,535 | B1 * | 3/2001 | Hara | F02D 11/107 123/396 |
| 6,263,858 | B1 * | 7/2001 | Pursifull | F02D 11/105 123/361 |
| 6,318,337 | B1 * | 11/2001 | Pursifull | F02D 11/10 123/396 |
| 6,431,144 | B1 * | 8/2002 | Daly | F02D 11/107 123/399 |
| 6,543,220 | B2 * | 4/2003 | Yoshida | F02D 41/042 60/274 |
| 6,640,688 | B1 * | 11/2003 | Harper | F15B 15/066 92/129 |
| 6,662,790 | B1 | 12/2003 | Kawamura et al. | |
| 6,711,492 | B1 * | 3/2004 | Pursifull | F02D 11/107 123/399 |
| 6,732,707 | B2 * | 5/2004 | Kidokoro | F02D 9/02 123/319 |
| 6,769,398 | B2 * | 8/2004 | Surnilla | F02D 41/0045 123/198 F |
| 6,837,226 | B2 * | 1/2005 | Wang | F02M 26/48 123/568.16 |
| 6,848,420 | B2 * | 2/2005 | Ishiguro | F02D 11/105 123/399 |
| 6,874,471 | B2 * | 4/2005 | Hoshino | F02D 11/106 123/399 |
| 7,051,709 | B1 * | 5/2006 | Muto | F02D 11/105 123/399 |
| 7,111,610 | B2 * | 9/2006 | Nidigattu | F02D 11/105 123/396 |
| 7,210,452 | B2 * | 5/2007 | Nakashima | F02D 11/107 123/361 |
| 7,343,899 | B2 * | 3/2008 | Kanno | F02B 61/045 123/350 |
| 7,434,566 | B2 * | 10/2008 | McKay | F02D 11/107 123/337 |
| 7,503,311 | B2 * | 3/2009 | Nichols | F02D 11/107 123/361 |
| 7,509,939 | B2 * | 3/2009 | Asano | F02D 11/107 123/399 |
| 7,730,860 | B2 * | 6/2010 | Ito | F01L 1/34 123/90.15 |
| 8,627,802 | B2 * | 1/2014 | Horiba | F02D 41/0032 123/520 |
| 8,812,914 | B2 * | 8/2014 | Jensen | G06F 11/0793 709/223 |
| 2003/0062030 | A1 * | 4/2003 | Oashi | F02D 41/08 123/496 |
| 2003/0226542 | A1 * | 12/2003 | Hoshino | F02D 11/106 123/399 |
| 2004/0069967 | A1 * | 4/2004 | Kohlen | F02D 9/10 251/305 |
| 2006/0081216 | A1 * | 4/2006 | Muto | F02D 11/105 123/350 |
| 2006/0196473 | A1 * | 9/2006 | Hasegawa | F02D 9/02 123/406.47 |
| 2008/0167790 | A1 * | 7/2008 | Kotooka | F02D 41/0065 701/108 |
| 2008/0202118 | A1 * | 8/2008 | Ide | F02D 41/0052 60/605.2 |
| 2008/0289605 | A1 * | 11/2008 | Ito | F01L 13/0063 123/435 |
| 2009/0012692 | A1 * | 1/2009 | Nakamura | F02D 11/107 701/102 |
| 2009/0206290 | A1 * | 8/2009 | Wygnanski | E21B 34/066 251/129.15 |
| 2009/0265084 | A1 * | 10/2009 | Enomoto | F02D 41/0055 701/112 |
| 2010/0282222 | A1 | 11/2010 | Ide et al. | |
| 2012/0137710 | A1 * | 6/2012 | Reimann | F24F 13/10 62/89 |

FOREIGN PATENT DOCUMENTS

| | | | |
|---|---|---|---|
| EP | 1 310 660 | 5/2003 | |
| JP | 62082238 A * | 4/1987 | |
| JP | 7-189763 | 7/1995 | |
| JP | 10-122058 | 5/1998 | |
| JP | 2970369 | 11/1999 | |
| JP | 2000320377 A * | 11/2000 | |
| JP | 2002161758 A * | 6/2002 | |
| JP | 2003-106241 | 4/2003 | |
| JP | 2003262178 A * | 9/2003 | |
| JP | 2009121298 A * | 6/2004 | |
| JP | 2004-278307 | 10/2004 | |
| JP | 2006-132449 | 5/2006 | |
| JP | 2006132449 A * | 5/2006 | ............ Y02T 10/40 |
| JP | 2006-161569 | 6/2006 | |
| JP | 2007-255251 | 10/2007 | |
| JP | 2007-263051 | 10/2007 | |
| JP | 2008-75517 | 4/2008 | |
| JP | 2009-215926 | 9/2009 | |
| JP | 2009-275516 | 11/2009 | |

OTHER PUBLICATIONS

Korean Notice of Allowance issued Dec. 4, 2013 in corresponding Korean Application No. 10-2012-7000432 (with English translation).

(56) References Cited

OTHER PUBLICATIONS

Decision to grant a patent, with English translation, issued Sep. 9, 2013 in corresponding Japanese Patent Application No. 2010-015900.
International Preliminary Report on Patentability and Written Opinion of the International Searching Authority issued Sep. 18, 2012 in corresponding International Application No. PCT/JP2011/050473 (with English translation).
Extended European Search Report issued Oct. 19, 2015 in corresponding European patent application No. 11 73 6856.

* cited by examiner

Related Art

CONTROL DEVICE AND CONTROL METHOD USED FOR ENGINE INTAKE AIR-OR-GAS SYSTEM

BACKGROUND OF THE INVENTION

1. Field of the Invention

The present invention relates to a control device and a control method of a control valve which is used for an intake air (an intake air-gas) system of an engine. The device is provided the control valve which is an intake air throttle valve provided in the intake air-gas system provided in the intake air-gas system of the engine to control the flow rate of intake air to the engine, oran EGR valve provided in the intake air-gas system of the engine to control the flow rate of EGR gas to the engine; and
  a control unit which determines a target opening of the control valve used for an intake air-gas system, in response to the operation conditions of the engine, and controls the opening of the control valve used for an intake air-gas system so that the opening conforms with the target opening.

2. Description of the Related Art

As a technology reducing NOx in the exhaust gas emitted from an internal combustion engine, an exhaust gas recirculation device (hereafter abbreviated as an EGR device) is known. In the EGR device, a part of the exhaust gas in the exhaust gas passage is extracted as an EGR gas; the EGR gas is returned to an intake air passage through an EGR passage. Hence, when the EGR device is used, a mix of fresh intake air as well as a part of the exhaust gas, namely, an EGR gas is led into a combustion chamber.

The EGR device as described above is provided with an EGR control valve; the opening of the EGR control valve is controlled and the flow rate of the EGR gas returned to the intake air passage is controlled.

When the EGR control valve in the EGR device becomes out of order, the flow rate of the EGR gas returned to the intake air passage cannot be controlled. Thus, there may arise an apprehension that: the flow rate of the EGR gas becomes in surplus or shortage; or, the flow of the EGR gas is stopped.

Hence, various technologies in which a malfunction of the EGR control valve can be diagnosed have been proposed.

For instance, JP1998-122058 discloses a technology in which it is judged that the device including an EGR control valve is out of order when the device confirmed that a detected actual valve opening does not change in response to the target valve opening, while the device is detecting the actual valve opening by use of an actual valve opening detecting means. Hereby, the actual valve opening changes according to the change of the target opening after the target opening begins changing in a case where an EGR operation condition under which the target opening of the EGR control valve changes over a predetermined value holds.

Further, JP2007-255251 discloses an exhaust gas recirculation device as shown in FIG. 18, the device having: an EGR control valve 102 provided with a valve shaft 102b; a driving means 106 in which a reciprocating shaft 112 arranged on a line extended along the valve shaft 102b performs a to-and-fro movement in the axis direction; and, a control means (not shown. The exhaust gas recirculation device is configured so that the reciprocating shaft 112 of the driving means 106 opens the EGR control valve 102 by pressing an edge point of the center axis of the EGR control valve 102, and the control means judges the occurrence of the malfunction of the EGR control valve 102 by the magnitude level of a duty ratio of the control signal oscillated toward the driving means 106 from the control means.

SUMMARY OF THE INVENTION

1. Subjects to be Solved

However, in each of JP1998-122058 and JP2007-255251, even in a case where the EGR control valve is out of order, the actual opening of the EGR control valve agrees with the target opening of the valve; thus, the malfunction of the valve cannot be detected under an operating condition that the target opening is not changed.

Above all, in a case where the target opening of the EGR control valve is 0, the EGR control valve with its own structure is provided with a function to press the valve toward the full closed direction; thus, the actual opening apparently follows the target opening so that it is difficult to detect the malfunction.

Further, in relation to the EGR control valve including the control valve disclosed by each technology of JP1998-122058 and JP2007-255251, when the opening is kept at a certain same level for a long duration of time, there arises a problem of loss of lube-oil (oil film breakage) in the motor bearing 101 as shown in FIG. 18, because of minutely small rotation perturbation of an EGR motor. Thus, the damage of the motor bearing is caused by the loss of the lube-oil, and a risk of malfunction or sticking of the EGR control valve arises.

Further, under the operation condition that the actual opening agrees with the target opening and the target opening is unchanged as described above, the malfunction of the control valve cannot be detected. Further, when the opening is kept at a certain same level for a long duration of time, there arises a problem of control valve sticking due to the loss of lube-oil. These problems are not limited to only the EGR control valve but also a control valve used in an air intake system of an engine, for instance, a throttle valve installed in the intake passage through which the air from the outside is supplied to the engine.

Consequently, in view of the problems in the conventional technologies, the present invention aims at providing a control device and a control method of a control valve which is used for an intake air-gas system of an engine, wherein: the malfunction of the control valve used for the intake air-gas system can be detected even under the operation condition that the actual opening agrees with the target opening and the target opening is unchanged; and the control valve sticking attributable to a damage of the motor bearing can be prevented, the damage being caused by a lube-oil loss due to the condition that the opening of the EGR control valve is kept at a same constant level for a certain long duration of time.

2. Means to Solve the Subjects

In order to overcome the problems as described above, the present invention discloses a control device of a control valve used for an intake air-gas system of an engine. The device includes, but is not limited to:
  the control valve which is
    an intake air throttle valve provided in the intake air-gas system provided in the intake air-gas system of the engine to control the flow rate of intake air to the engine, or an EGR valve provided in the intake air-gas system of the engine to control the flow rate of EGR gas to the engine; and a control unit which determines a target opening of the control valve in response to the operation conditions of the engine, and controls the opening of the control valve so that the opening conforms with the target opening, wherein the control unit is configured so that, in a case where the target opening is maintained at a same level during over a fixed duration, the target opening is changed, in time, from the target opening which is determined in response to the operation conditions of the engine and controls the opening of the control valve, in order to prevent the control valve from being out of order as well as in order to detect a failure of the control valve.

By changing the target opening in time, the opening of the control valve used for the intake air system can be prevented from being kept at a same constant level for a certain long duration of time. Hence, the sticking problem and the like of the control valve used for the intake air system can be avoided. The sticking problem and the like is attributable to the motor bearing damage caused by a lube-oil loss due to the condition that the opening of the EGR control valve is kept at a same constant level for a certain long duration of time.

Further, according to the above, the target opening is changed in time; thus, the technology as disclosed above can be free from a conventional problem that the malfunction cannot be detected under the operation condition that the target opening stays unchanged. Further, according to the present invention, by confirming the tracking performance of the actual opening of the control valve used for the intake air system in response to the target opening, the malfunction of the control valve used for the intake air system can be detected.

A preferable embodiment of the invention is the control device of the control valve used for the intake air-gas system of the engine. The control unit changes the target opening, in time, in a range of a dead zone where the flow rate of the intake air or the flow rate of the EGR gas is not influenced by the opening of the control valve used for the intake air-gas system even when the opening of the control valve is changed.

In the operating range of the opening of the control valve such as the EGR control valve or the throttle valve used for the intake air system, there is a dead zone in which the parameters such as the EGR gas flow rate, the EGR gas mixing ratio (i.e. EGR ratio) in the intake air, the intake-air flow rate, the oxygen excess ratio and the air excess ratio are almost unchanged even when the opening of the valve is changed. The condition of the dead zone or the existing range of the dead zone is different a control valve to a control valve and depends on the size or the structure of the valve; the range of the dead zone of a control valve is an intrinsic property of the control valve. The dead zone is usually an opening range of about 60 to 100% of the total opening range.

Even when the target opening is changed in time in the dead zone and the opening of the control valve used for the intake air system is changed in response to the target opening, there is little influence on the parameters such as the EGR gas flow rate, the EGR gas mixing ratio (i.e. EGR ratio) in the intake air, the intake-air flow rate, the oxygen excess ratio and the air excess ratio. Hence, the present invention can be put into practice without influencing on the engine operation condition.

Another preferable embodiment of the invention is the control device of the control valve used for the intake air-gas system of the engine, wherein, in temporally changing the target opening, the control unit judges that the control valve used for the intake air-gas system is out of order, in a case where a time duration in which the difference between the target opening and the actual opening of the control valve used for the intake air-gas system exceeds a predetermined allowable level continues over a predetermined allowable time duration. In this way, the malfunction of the control valve used for the intake air system can be surely detected.

Another preferable embodiment of the invention is the control device of the control valve used for the intake air-gas system of the engine, wherein, in changing the target opening, in time, the control unit maintains the target opening without changing the target opening, in a case where the difference between the target opening and the actual opening of the control valve used for the intake air-gas system exceeds a predetermined allowable level.

According to the above, it can be identified whether the cause of the malfunction is attributable to a reason that the opening of the EGR valve stays unchanged or another reason that the response to the opening command is slow, the malfunction being a condition that the difference between the actual opening and the target opening of the control valve used for the intake air system exceeds an allowable limit value.

Another preferable embodiment of the invention is the control device of the control valve used for the intake air-gas system of the engine, wherein the control unit forcefully fixes the target opening at a constant level in a range within the dead zone in a case where the target opening is not maintained at a same opening level over the fixed duration and the target opening is in the range within the dead zone.

According to the above, in a time period where it is unnecessary to change the target opening in time, the control valve used for the intake air system can be prevented from being frequently oscillated within the dead zone. In this way, the troubles such as the wear of the seal of the valve shaft and the exhaust gas leakage from the seal part can be avoided.

Another preferable embodiment of the invention is the control device of the control valve used for the intake air-gas system of the engine, wherein:

the control unit holds a function representing a relationship between a parameter $\theta$ determined in response to the engine operation conditions and the target opening; and the function includes a hysteresis element.

Further, as a method contrivance, the present invention discloses a control method of a control valve used for an intake air-gas system of an engine, the method including, but not limited to, the steps of:

determining a target opening of the control valve used for an intake air-gas system in response to the operation conditions of the engine, the control valve being an intake air throttle valve to control the flow rate of intake air to the engine or an EGR valve to control the flow rate of EGR gas to the engine; and regulating the opening of the control valve so that the opening conforms with the target opening, wherein, in a case where the target opening is maintained at a same level over a fixed duration in time, the method further includes, but not limited to, the steps of:

changing the target opening, in time, from the target opening of the control valve in response to the operation conditions of the engine; and preventing the control valve from being out of order detecting as well as detecting a failure of the control valve.

A preferable embodiment of the invention is the control method of the control valve used for the intake air-gas system of the engine, wherein the target opening is changed, in time, in a range of a dead zone where the flow rate of the intake air or the flow rate of the EGR gas is not influenced by the opening of the control valve used for the intake air-gas system even when the opening of the control valve is changed.

Another preferable embodiment of the invention is the control method of the control valve used for the intake air-gas system of the engine, wherein, in changing the target opening, in time, it is judged that the control valve used for the intake air-gas system is out of order, in a case where a time duration in which the difference between the target opening and the actual opening of the control valve used for the intake air-gas system exceeds a predetermined allowable level continues over a predetermined allowable time duration.

Another preferable embodiment of the invention is the control method of the control valve used for the intake air-gas system of the engine, wherein, in changing the target opening, in time, the target opening is maintained without changing the target opening, in a case where the difference between the target opening and the actual opening of the control valve used for the intake air-gas system exceeds a predetermined allowable level.

Another preferable embodiment of the invention is the control method of the control valve used for the intake air-gas system of the engine, wherein the target opening is forcefully fixed at a constant level in a range within the dead zone in a case where the target opening is not maintained at a same opening level over the fixed duration and the target opening is in the range within the dead zone.

3. Effects of the Invention

According to the present invention, a control device and a control method of a control valve which is used for an intake air-gas system of an engine can be supplied, wherein: the malfunction of the control valve used for the intake air-gas system can be detected even under the operation condition that the actual opening agrees with the target opening and the target opening is unchanged; and the control valve sticking attributable to damage of the motor bearing can be prevented. The damage is caused by a lube-oil loss due to the condition that the opening of the EGR control valve is kept at a same constant level for a certain long duration of time.

DETAILED DESCRIPTION OF THE INVENTION

Hereafter, the present invention will be described in detail with reference to the modes or embodiments shown in the figures. However, the dimensions, materials, shape, the relative placement and so on of a component described in these modes or embodiments shall not be construed as limiting the scope of the invention thereto, unless especially specific mention is made.

(First Mode)

Figure 1:
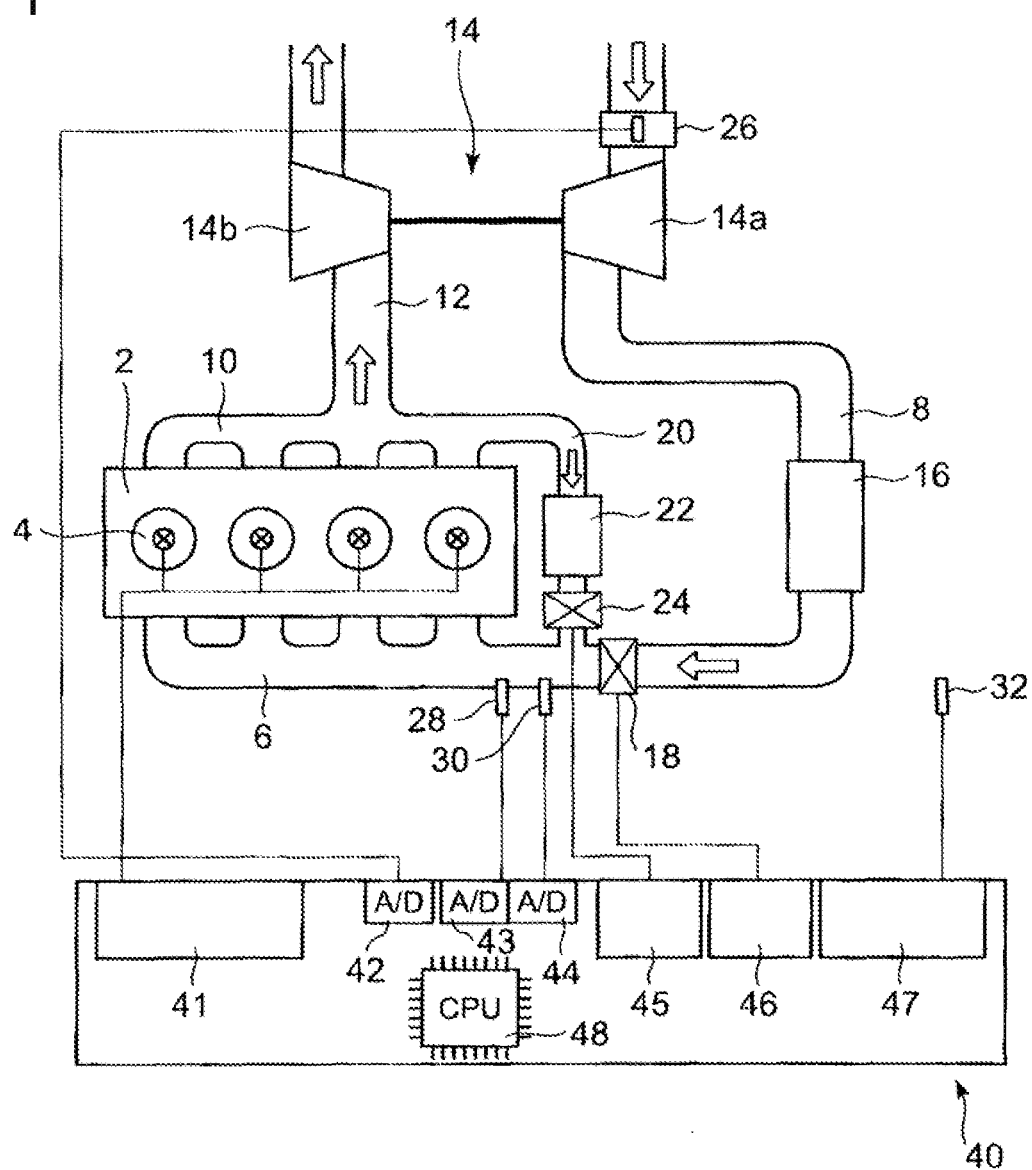
FIG. 1 shows an outline of an EGR device to which a control device of an EGR control valve is applied.

FIG. 1 shows an outline of an EGR device to which a control device of an EGR control valve according to a first mode of the present invention is applied. In FIG. 1, an engine 2 is a four stroke cycle diesel engine of four cylinders.

An intake air passage 8 joins the engine 2 via an intake manifold 6. Further, the engine is connected to an exhaust gas passage 12 via an exhaust manifold 10.

In the intake air passage 8, a compressor 14a of a turbocharger 14 is provided. The compressor 14a is driven by a shaft common to the compressor 14a and a turbine 14b as described later. In the intake air passage 8, on the downstream side of the compressor 14a, an intercooler 16 is provided. Further, in the intake air passage 8, on a downstream side of the intercooler 16, a throttle valve 18 by which the flow rate of the intake air streaming through the intake air passage 8 is regulated is provided.

In the exhaust gas passage 12, the turbine 14b of the turbocharger 14 is provided. The turbine 14b is driven by the exhaust gas from the engine 2. Further, the exhaust manifold 10 is connected to an EGR passage 20 through which a part of the exhaust gas is re-circulated to the intake air side. On a part way of the EGR passage 20, an EGR cooler 22 and an EGR control valve 24 are provided.

The EGR cooler 22 is provided on an exhaust manifold side of the EGR control valve 24. Heat exchange is performed between the EGR gas and cooling water which pass through the EGR cooler 22 so that the temperature of the EGR gas is reduced. Further, the EGR control valve 24 regulates the flow rate of the EGR gas passing through the EGR passage 20.

The valve opening of the EGR control valve 24 as well as the throttle valve 18 is controlled by an engine control unit (ECU) 40.

The outline of the valve opening control regarding the EGR control valve 24 as well as the throttle valve 18 is now explained. Into the ECU 40, an actual opening of the EGR control valve 24 as well as the throttle valve is inputted. Further, a detected value (a signal) detected by an intake air temperature sensor 28 fitted to the intake air passage 8 or the intake manifold 6 on the downstream side of the throttle valve 18 is inputted into the ECU 40, via an A/D convertor 43; similarly, a detected value detected by an intake air pressure sensor 30 fitted to the intake air passage 8 or the intake manifold 6 on the downstream side of the throttle valve 18 is inputted into the ECU 40, via an A/D convertor 44. Further, a detected value detected by an air flow meter 26 fitted to the intake air passage 8 on the upstream side of the compressor 14a is inputted into the ECU 40, via an A/D convertor 42. Further, a detected value detected by an engine speed sensor 32 is inputted into the ECU 40, via a pulse counting circuit 47.

In the ECU 40, based on the inputted values as described above, the target opening of the EGR control valve 24 as well as the throttle valve 18 is computed. Based on the computed result, the opening of the EGR control valve 24 is controlled via a driving circuit; and the opening of the throttle valve 18 is controlled via a driving circuit 46. Further, In a CPU 48, as well as the throttle valve 18 is controlled via a driving circuit, based on the inputted values as described above, the injection quantity of the fuel supplied to the engine 4 is computed; based on the computed result, the fuel injection quantity is controlled via an injector drive circuit 41.

Figure 2:
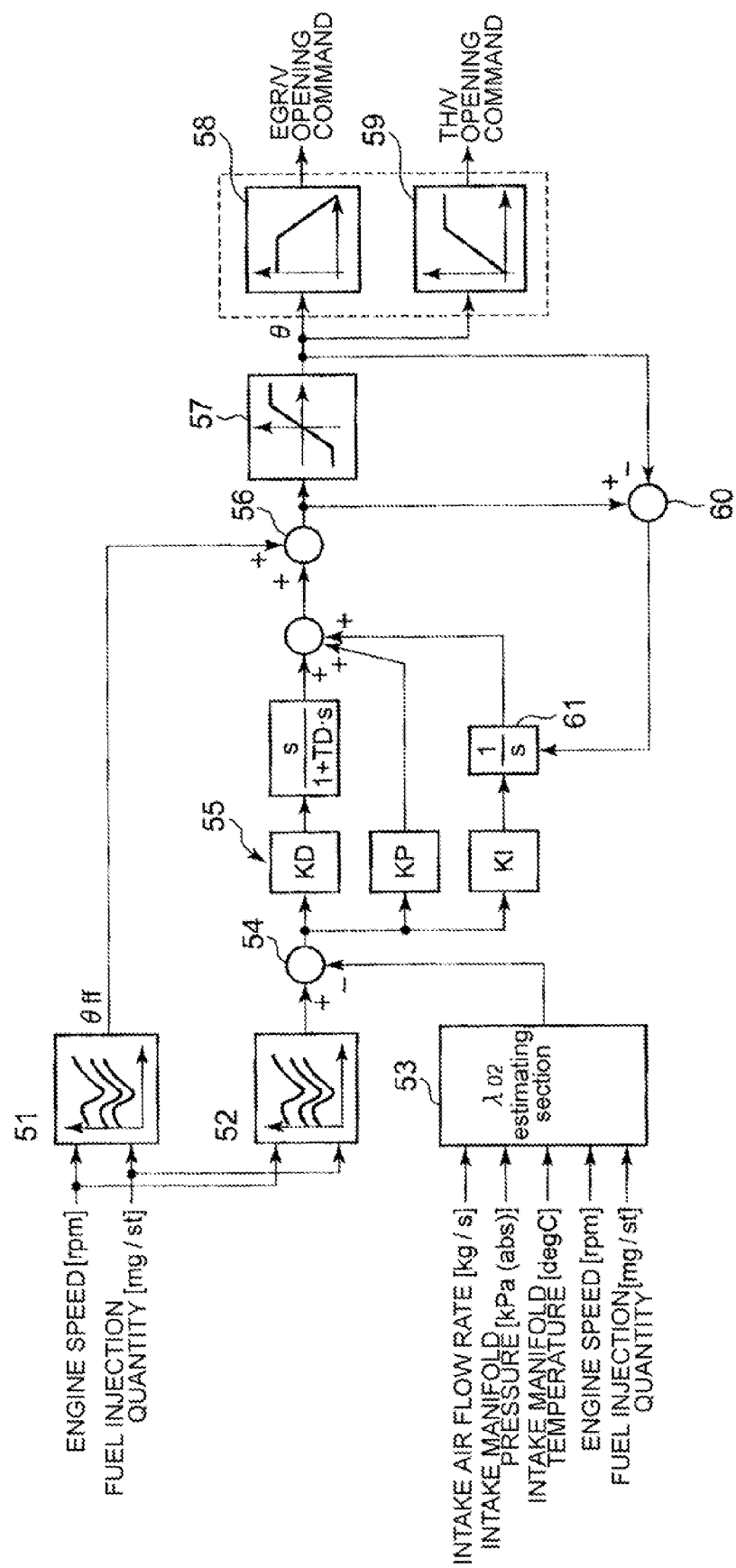
FIG. 2 shows an example of the control logic by which an ECU performs the control.

FIG. 2 shows an example of the control logic by which an ECU performs the control. In the ECU 40, the air flow rate [kg/s], the engine speed [rpm], the intake manifold air pressure [kPa], the intake manifold air temperature [° C.] and the fuel injection quantity [mg/st] are inputted into a $\theta$ target map 51 as well as a $\lambda_{o2}$ target map 52; based on the inputted values, a target $\theta$ and a target $\lambda_{o2}$ are generated. Hereby, the $\theta$ is a value determined according to the opening of the EGR control valve 24 as well as the throttle valve 18; the detail will be described later. Incidentally, the $\lambda_{o2}$ is the oxygen excess ratio.

Further, an estimated $\lambda_{o2}$ is computed by a $\lambda_{o2}$ estimating section 53 based on the data (variables) such as the air flow rate [kg/s], the engine speed [rpm], the intake manifold air pressure [kPa], the intake manifold air temperature [° C.] and the fuel injection quantity [mg/st].

Further, the error between the target $\lambda_{o2}$ and the estimated $\lambda_{o2}$ is computed by a subtraction process 54. And, based on the error, a PID control 55 is performed. A parameter $\theta$ is determined by the PID control 55; the $\theta$ is added to a target $\theta$; and a saturation operation 57 is performed for the aggregation so that the $\theta$ is corrected. Based on the corrected $\theta$, an opening command value for the EGR control valve 24 is determined by use of a function 58 for determining the opening of the EGR control valve 24, the function 58 being a function with respect to the parameter $\theta$. Further, based on the corrected $\theta$, an opening command value for the throttle valve 18 is determined by use of a function 59 for determining the opening of the throttle valve 18, the function 59 being a function with respect to the parameter $\theta$. In addition, the functions 58 and 59 are memorized in the ECU 40 in advance.

Further, each of the EGR control valve 24 and the throttle valve 18 has a fully opened position as well as a fully closed position. In other word, the opening of each valve shows saturation behavior. Hence, when the opening of the EGR control valve 24 or the throttle valve 18 reaches the fully opened position or the fully closed position, a condition that the control error remains continues. On the other hand, the error which is inputted in the PID control 55 is kept in a non-zero condition. Therefore, the integrated value in the PID control 55 continues to increase. Thus, there arises a problem of a wind-up behavior where the control responsiveness is hindered. In order to avoid the wind-up problem, the difference between the parameter $\theta$ as the output of the PID control 55 and the corrected parameter $\theta$ as the output of the saturation operation 57 is computed by a subtraction process 60; based on the computed difference, namely, an error, an anti-windup compensation is performed.

In addition, in the operating range (as to the opening range) of each of the EGR control valve 24 and the throttle valve 18, there is a characteristic range (hereafter called a dead zone) in which the parameters such as the EGR gas flow rate, the EGR gas mixing ratio (i.e. EGR ratio) in the intake air, the intake-air flow rate, the oxygen excess ratio and the air excess ratio are almost unchanged even when the opening of the valve is changed.

Figure 3:
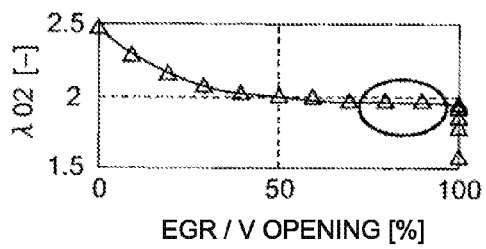
FIG. 3 is a graph which shows an example of a characteristic of the EGR control valve.
Figure 4:
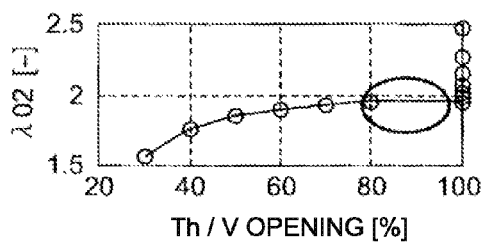
FIG. 4 is a graph which shows an example of a characteristic of a throttle valve.

Based on FIGS. 3 and 4, the above-described dead zone is hereby explained with the oxygen excess ratio as an example of the parameters.

FIG. 3 is a graph which shows an example of a characteristic of the EGR control valve 24; and FIG. 4 is a graph which shows an example of a characteristic of a throttle valve 18

In FIG. 3, the vertical axis denotes the oxygen excess ratio $\lambda_{o2}$, whereas the lateral axis denotes the valve opening [%] of the EGR control valve 24. Further, in FIG. 3, the vertical axis denotes the oxygen excess ratio $\lambda_{o2}$, whereas the lateral axis denotes the valve opening [%] of the throttle valve 18.

As shown in FIG. 3, in a case of the EGR control valve 24, the oxygen excess ratio $\lambda_{o2}$ is almost unchanged when the opening of the EGR control valve 24 is in a range of about 60 to 100%, especially, in a range of about 80 to 100%. In other words, regarding the EGR control valve 24 having the characteristic as shown in FIG. 3, the range of about 60 to 100% can be called the dead zone of the EGR control valve 24. Incidentally, in the dead zone, the variables such as the EGR gas flow rate, the EGR gas mixing ratio (i.e. EGR ratio) in the intake air, the intake-air flow rate, and the air excess ratio other than the oxygen excess ratio $\lambda_{o2}$ are also almost unchanged with respect to the change of the opening of the EGR control valve 24, the variables being dependent on the valve opening.

In a similar way, regarding the throttle valve 18 having the characteristic as shown in FIG. 4, a range of about 70 to 100%, especially, a range of about 80 to 100% can be called the dead zone as to the opening of the throttle valve 18.

Figure 5:
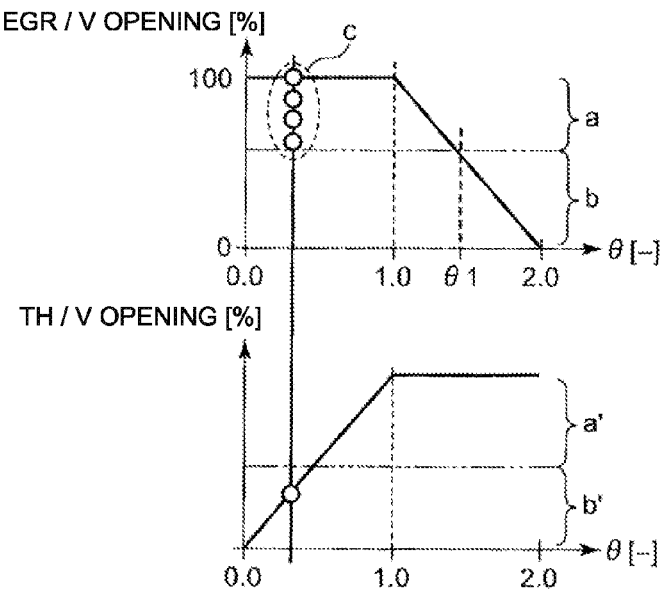
FIG. 5 shows an example of a function which determines the opening of the EGR control valve based on a parameter θ in a first mode as well as an example of a function which determines the opening of the throttle valve based on the parameter θ in the first mode.

The upper side of FIG. 5 shows an example of a function which determines the opening of the EGR control valve 24 with respect to a parameter θ, whereas the lower side of FIG. 5 shows an example of a function which determines the opening of the throttle valve 18. The upper side and the lower side correspond to the functions 58 and 59 as shown in FIG. 2, respectively.

In the upper side drawing of FIG. 5, the vertical axis denotes the target opening (the command opening) as to the EGR control valve 24 and the lateral axis denotes the parameter θ; and, in the lower side drawing of FIG. 5, the vertical axis denotes the target opening (the command opening) as to the throttle valve 18 and the lateral axis denotes the parameter θ.

Hereby, θ is a variable dependent on the opening of the EGR control valve 24 as well as the throttle valve 18. Further, when the opening of the EGR control valve 24 is 100%, the opening (0 to 100%) of the throttle valve 18 is expressed as θ to 1. In a similar way, when the opening of the throttle valve 18 is 100%, the opening (0 to 100%) of the EGR control valve 24 is expressed as 2 to 1.

Hence, in the upper side drawing of FIG. 5, the target opening of the EGR control valve 24 is 100% in response to the parameter θ in the range of θ=0 to 1; and, the target opening of the EGR control valve 24 monotonically and linearly decreases from 100% to 0% in response to the parameter θ in the range of θ=1 to 2. In the lower side drawing of FIG. 5, the target opening of the throttle valve 18 monotonically and linearly increases from 0% to 100% in response to the parameter θ in the range of θ=0 to 1; and, the target opening of the throttle valve 18 is 100% in response to the parameter θ in the range of θ=1 to 2.

Further, in the upper side drawing of FIG. 5, the area expressed by a symbol 'a' corresponds to the dead zone of the EGR control valve opening; on the other hand, the area expressed by a symbol 'b' is an area in which the sensitivity to the EGR control valve opening change can be acknowledged. In a similar way, in the lower side drawing of FIG. 5, the area expressed by a symbol 'a' corresponds to the dead zone of the throttle valve opening; on the other hand, the area expressed by a symbol 'b' is an area in which the sensitivity to the throttle valve opening change can be acknowledged.

Figure 18:
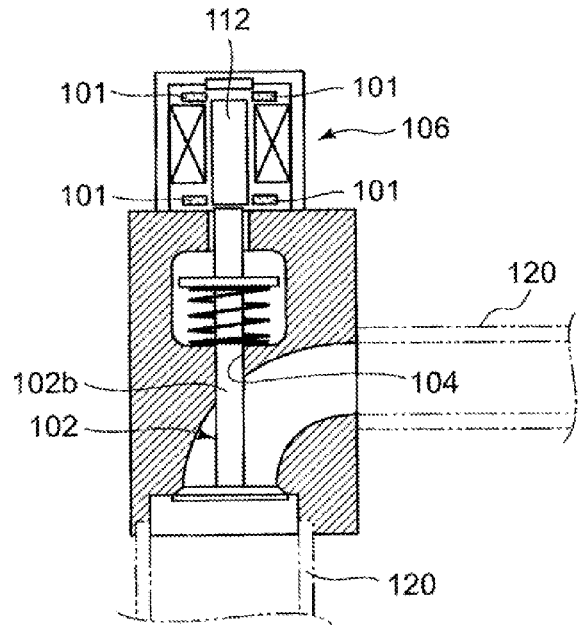
FIG. 18 shows a cross section around a conventional EGR control valve.

Hereby, based on the control logic as shown in FIG. 2, a case where the parameter θ smaller than 1.0 is outputted as a command value (signal) is discussed. In this event, as is clear from FIG. 5, the target opening of the EGR control valve 24 is 100% in view of the conventional approach; accordingly, the opening of the EGR control valve 24 stays at an almost constant level (100%) for a long duration of time. Thus, in the conventional approach, there arises a problem of loss of lube-oil (oil film breakage) in a motor bearing as shown in FIG. 18; a damage of the motor bearing due to the loss of the lube-oil; or, a risk of malfunction or sticking of the EGR control valve. Further, in the conventional approach, when the parameter θ is in the range (smaller than 1.0), the target opening is unchanged; thus, when the EGR control valve fails, the actual opening agrees with the target opening. In other words, in the conventional approach, if the actual opening is 100% in a case of the valve failure, the failure cannot be detected or acknowledged.

Figure 12:
FIG. 12 is a graph which shows the change of the target opening of the EGR control valve in response to elapsed time, under a condition that the target opening of the EGR control valve is near zero.

In the present invention, attention is paid to the fact that, even when the opening of the EGR control valve is changed, the above-described variable such as the oxygen excess ratio $\lambda_{o2}$ is almost unchanged in the EGR control valve dead zone in which the opening of the valve is about 60 to 100%; to be more specific, in a case where the target opening of the EGR control valve is maintained at a same constant level for a certain prolonged duration of time, the target opening is intentionally changed in the dead zone, as shown in FIG. 12 with the symbol c. In this way, the target opening of the EGR control valve 24 varies; thus, the malfunction such as sticking of the EGR control valve can be avoided. Hereby, the malfunction such as sticking is attributable to the failure of the motor bearing, the failure being caused by the condition in which the opening of the EGR control valve is kept at a same constant level for a certain prolonged duration of time. Thereby, the failure of the EGR control valve can be detected.

Changing the target opening of the EGR control valve in the dead zone as described above is feasible, when the target opening as the function with respect to the parameter θ is in the dead zone; for instance, in the upper drawing of FIG. 5, this change can be feasible when a condition θ<θ1 is satisfied.

Figure 6:
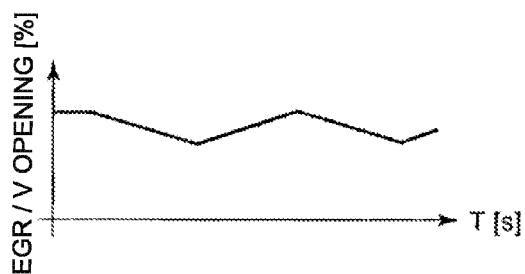
FIG. 6 is a graph which shows the change of the target opening of the EGR control valve in response to an elapsed time, in a case where the target opening of the EGR control valve is changed in a dead zone.

FIG. 6 is a graph which shows the change of the target opening of the EGR control valve in response to elapsed time, in a case where the target opening of the EGR control valve is changed in a dead zone. In FIG. 6, the vertical axis denotes the target opening of the EGR control valve 24 and the lateral axis denotes the elapsed time. For instance, as shown in FIG. 6, the target opening of the EGR control valve 24 is changed in time so that the change of the target opening in time forms a wave-shaped function. In this mode of the present invention, the target opening of the EGR control valve is changed so that the graph of the change of the EGR control valve target opening in time is configured as a wave form. As a matter of course, instead of the wave form, the graph of the change may be configured as another kind of geometry such as a rectangular pulse form, so long as the target opening of the EGR control valve is changed in time.

Figure 7:
FIG. 7 is a graph which shows the change of the target opening of the throttle valve in response to an elapsed time, in a case where the target opening of the EGR control valve is changed in the dead zone.

FIG. 7 is a graph which shows the change of the target opening of the throttle valve in response to elapsed time, in a case where the target opening of the EGR control valve is changed in the dead zone. In FIG. 7, the vertical axis denotes the target opening of the throttle valve and the lateral axis denotes the elapsed time. Hereby, the target opening of the throttle valve stays in an unchanged condition.

In the next place, the control regarding the above-described change of the target opening of the EGR control valve is now explained in detail by use of a flow chart.

Figure 8:
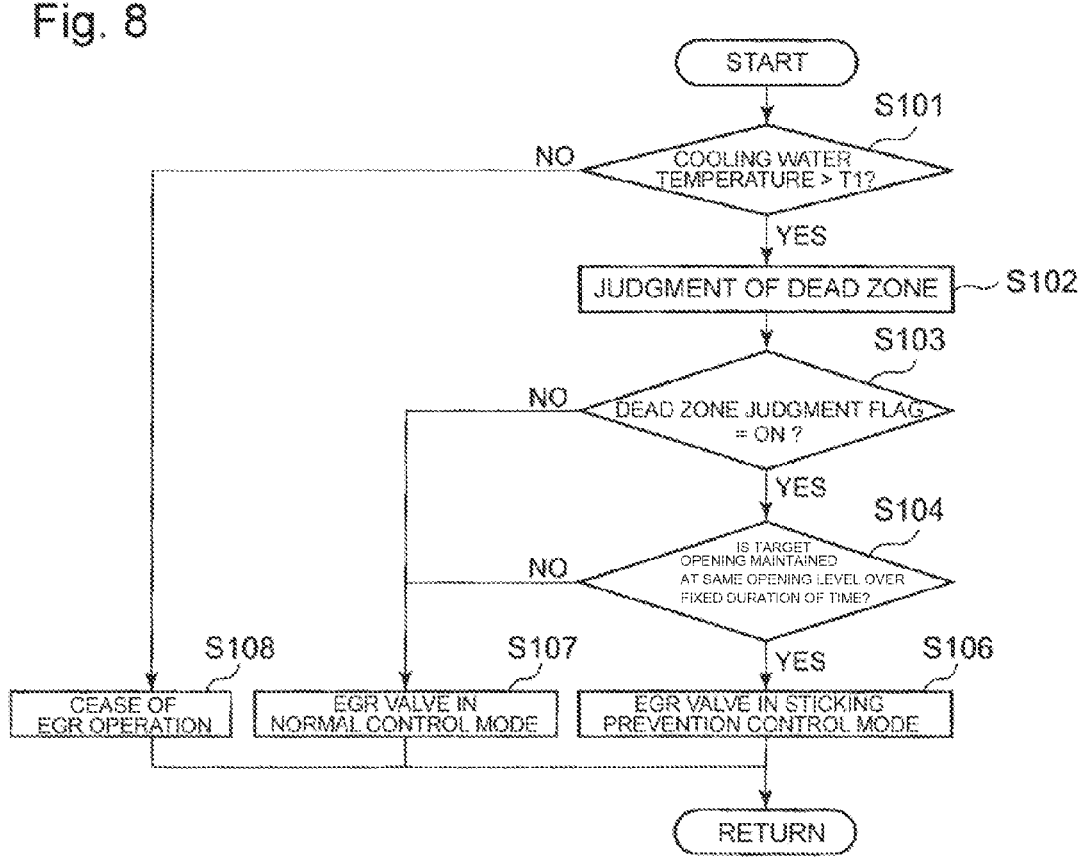
FIG. 8 is a flow chart which shows the control processes regarding the change of the target opening of the EGR control valve in the first mode.

FIG. 8 is the flow chart which shows the control processes regarding the change of the target opening of the EGR control valve in the first mode.

When a series of control processes starts, it is judged whether or not a cooling water temperature is higher than a temperature T1 in the step S101. The cooling water means the engine cooling water and the temperature T1 is a prescribed temperature. When the result of the judgment in the step S101 is negative, namely, when it is judged that the cooling water temperature is not higher than the temperature T1, the step S101 is followed by the step S108, where the EGR is stopped so as not to perform the EGR operation; and, the control flow reaches an end. When the result of the judgment in the step S101 is affirmative, namely, when it is judged that the cooling water temperature is higher than the temperature T1 in the step S101, the step S101 is followed by the step S102.

Figure 9:
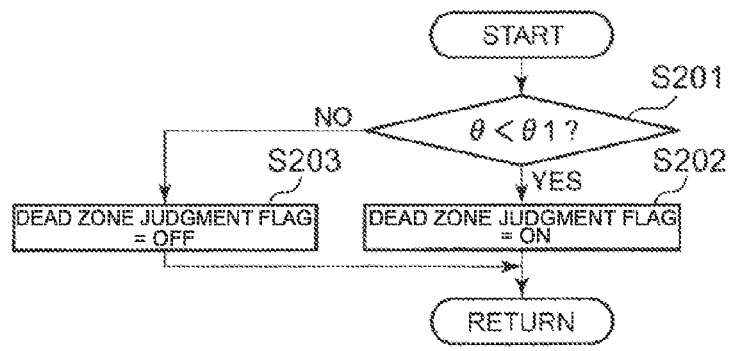
FIG. 9 is a flow chart which shows the processes handling the judgment regarding the dead zone.

In the step S102, the judgment as to the dead zone is performed. This judgment as to the dead zone is performed according to a flow chart as shown in FIG. 9. By use of FIG. 8, the dead zone judgment is explained.

When the control flow is started it is judged whether or not the condition $\theta<\theta1$ is satisfied in the step S201. Hereby, the parameter $\theta$ is a value (signal) which is ordered according to the logic described in FIG. 2. And, the parameter $\theta1$ is a coordinate of a boundary of the dead zone, the parameter corresponding to the symbol $\theta1$ in the upper drawing of FIG. 5.

When the judgment result in the step S201 is affirmative, namely, the condition $\theta<\theta1$ is satisfied, the step S201 is followed by the step S202, where a dead zone judgment flag is set (FLAG=ON). And, the control flow reaches an end (RETURN TO MAIN FLOW). Further, when the judgment result in the step S201 is negative, the step S201 is followed by the step S203, where a dead zone judgment flag is cleared (FLAG=OFF). And, the control flow reaches an end (RETURN TO MAIN FLOW).

When the dead zone judgment according to the flow chart of FIG. 9 is finished at the step S102 in the flow chart of FIG. 8, the step S102 is followed by the step S103.

In the step S103, it is judged whether or not the dead zone flag is ON.

When the judgment result in the step S103 is negative, namely, the dead zone flag is set at the condition FLAG=OFF, the step S103 is followed by the step S107, where the opening of the EGR control valve is controlled according to the opening command for the EGR control valve which is issued the function 58 as is the case with the conventional approach, without forcefully changing the target opening of the EGR control valve.

When the judgment result in the step S103 is affirmative, namely, the dead zone flag is set at the condition FLAG=ON, the step S103 is followed by the step S104.

In the step S104, it is judged whether or not it is about time to take a measure to prevent the sticking of the valve.

As described before, when the opening of the EGR control valve is kept at a constant level for a prolonged duration of time, the problem of loss of lube-oil (oil film breakage) is caused so that the motor bearing is damaged and sticking of the EGR control valve is caused. In other words, when the target opening of the EGR control valve is not kept at a constant level for a long duration of time, the problem such as sticking can be avoided. Based on this reason, in the step S104, it is judged whether or not the target opening of the EGR control valve is kept at a constant level over a certain duration of time as well as whether or not the duration of time exceeds a time period of necessary maintenance to take measures to prevent sticking. To be more specific, if the target opening of the EGR control valve stays at a constant level for a prescribed duration of time, it is judged that it is time to take a measure to prevent the sticking of the valve. Incidentally, the prescribed duration of time is to be determined at every EGR control valve in consideration of the performance of the EGR control valve or the periphery devices around the engine.

When the judgment result in the step S104 is negative, namely, when it is judged that it is not time to take a measure to prevent the sticking of the valve, the step S104 is followed by the step S107, where the opening of the EGR control valve is controlled according to the normal control mode of the EGR control valve, namely, without forcefully changing the target opening of the EGR control valve as is the case with the conventional approach.

When the judgment result in the step S104 is affirmative, namely, when it is judged that it is time to take a measure to prevent the sticking of the valve, the step S104 is followed by the step S106, where the opening of the EGR control valve is controlled according to an EGR valve sticking prevention mode. And, the control flow reaches an end. In the EGR valve sticking prevention mode, as is explained by the use of FIGS. 5 and 6, the target opening of the EGR control valve is changed within a range in the dead zone. In this way, the target opening is controlled so as to be changed; thus, the sticking of the EGR control valve can be avoided. The sticking is attributable to the failure of the motor bearing, and the failure is caused by the condition in which the opening of the EGR control valve is kept at a same constant level for a certain prolonged duration of time.

Further, in the EGR valve sticking prevention mode, a malfunction of the EGR control valve can be judged on the basis of the target opening and the actual opening of the EGR control valve. The judgment of the malfunction of the EGR control valve in the EGR valve sticking prevention mode is now explained based on a flow chart of FIG. 10.

Figure 10:
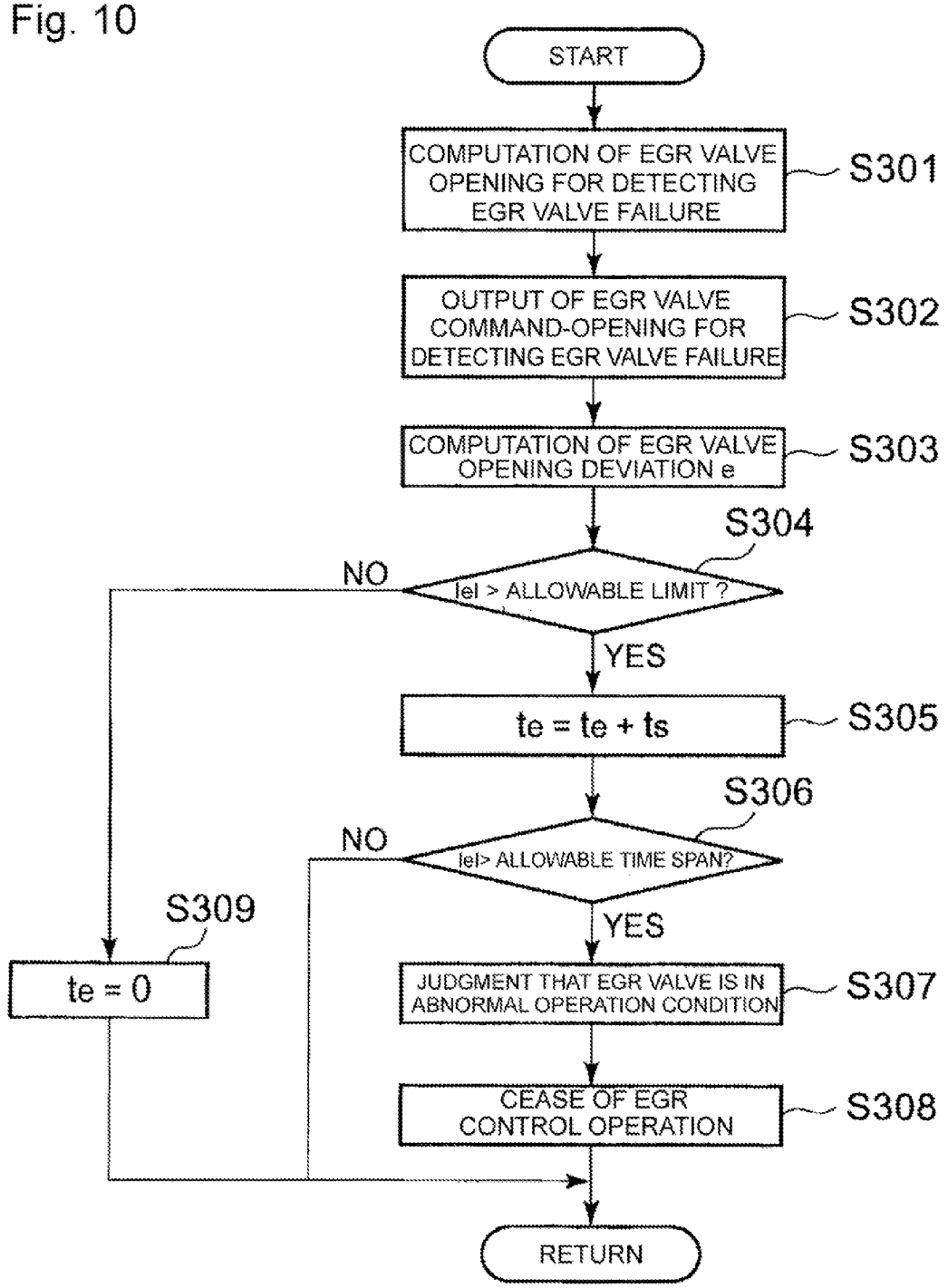
FIG. 10 is a flow chart which shows the processes handling the judgment regarding an abnormal condition in a case where the EGR control valve is in a sticking prevention operation mode.

FIG. 10 is a flow chart which shows the processes handling the judgment regarding the malfunction of the EGR control valve in the EGR valve sticking prevention mode.

In FIG. 10, when the control flow is started, the step S301 is performed. In the step S301, the target opening, that is, the command opening value of the EGR control valve is computed. The target opening can be obtained by use of the parameter $\theta$ and the function 58 after the computation of the parameter $\theta$ according to the processes of the logic as shown in FIG. 2.

When the step S301 is finished, the step S301 is followed by the step S302. In step S302, the opening command for the EGR control valve is outputted.

When the step S302 is finished, the step S302 is followed by the step S303.

In step S303, an EGR valve opening deviation e is computed; whereby, the deviation e means a difference between a command opening value and an actually measured opening value regarding the EGR control valve.

When the step S303 is finished, the step S303 is followed by the step S304.

In step S304, it is judged whether or not the absolute value $|e|$ (i.e. abs(e)) of the EGR valve opening deviation e is greater than an allowable value. The allowable value means a least upper bound of the absolute value $|e|$ to be allowed while the EGR control valve is used. The allowable value is a value to be determined at every EGR control valve in consideration of the performance of the EGR control valve or the periphery devices around the engine.

When the judgment in step S304 is negative, namely, when the absolute value $|e|$ is not greater than the allowable value, step S304 is followed by step S309, which is described later.

When the judgment in step S304 is affirmative, namely, when the absolute value $|e|$ is greater than the allowable value, the step S304 is followed by the step S305.

In the step S305, the computation according to the formula (1) below is performed.

$$t_e = t_e + t_s \tag{1}$$

Hereby, $t_e$ is a cumulative time in which the absolute value $|e|$ is greater than the allowable value; $t_s$ is an operation period, which is a time span from the start timing to the end timing of the control flow chart in FIG. 10.

Further, the cumulative time $t_e$ on the left side of the formula (1) is a current cumulative time; the cumulative time $t_e$ on the right side of the formula (1) is a cumulative time at the previous timing before one period. By the computation according to the formula (1), the current cumulative time (sum) in which the absolute value |e| has exceeded the allowable value can be obtained.

When the step S305 is finished, the step S305 is followed by the step S306.

In the step S306, it is judged whether or not the (current) cumulative time $t_e$ computed at the step S305 is longer than an allowable time span. The allowable time span means an upper bound time within which the accumulation of the cumulative time where the absolute value |e| has exceeded the allowable value (error) is regarded as being allowable. In other words, the allowable time span means an upper bound value of the cumulative time $t_e$. The allowable time span is a value to be determined at every EGR control valve in consideration of the performance of the EGR control valve or the periphery devices around the engine.

When the judgment in the step S306 is affirmative, namely, when the cumulative time $t_e$ is longer than the allowable time span, the step S306 is followed by the step S307, where it is judged that the EGR valve malfunctions. In the following step S308, the EGR control is stopped, and the control flow reaches an end.

When the judgment in step S306 is negative, namely, when the cumulative time $t_e$ is shorter than the allowable time span, the control flow is returned to an end without any other process.

When the judgment in step S304 is negative, or when the judgment in step S306 is negative, the step S304 or the step S306 is followed by the step S309, where the cumulative time $t_e$ is cleared ($t_e$=0). And, the control flow reaches an end.

Figure 11:
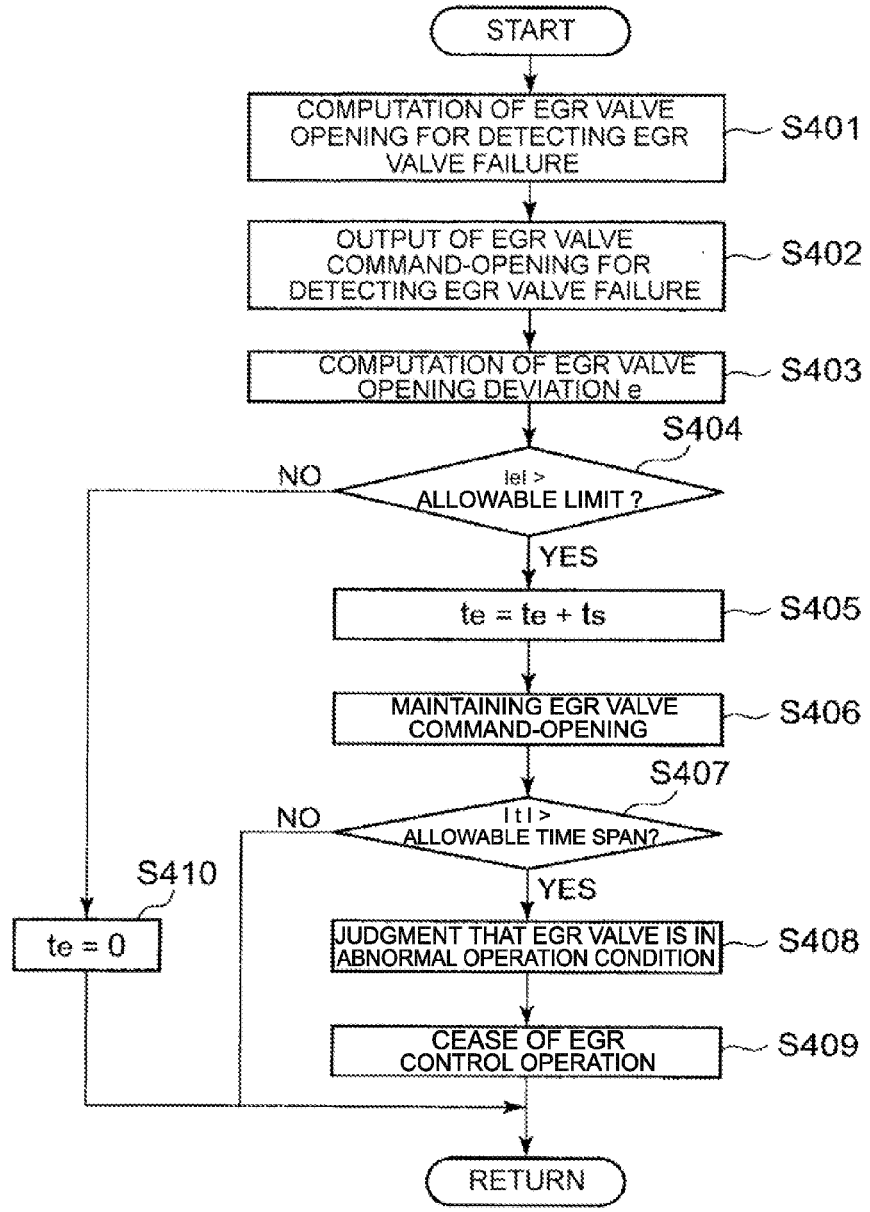
FIG. 11 shows another example of a flow chart which shows the processes handling the judgment regarding an abnormal condition in a case where the EGR control valve is in a sticking prevention operation mode.

According to a series of processes shown in the flow chart of FIG. 11 instead of the processes shown in the flow chart of FIG. 10, it can be judged whether or not a malfunction of the EGR control valve in the EGR valve sticking prevention mode is occurring.

Further, FIG. 11 shows another example of a flow chart which shows the processes handling the judgment regarding the malfunction in a case where the EGR control valve is in the sticking prevention operation mode.

The steps S401 to S405 in the flow chart of FIG. 11 are the same as the steps S301 to S305 in the flow chart of FIG. 10, respectively. In addition, the steps S407 to S410 in the flow chart of FIG. 11 are the same as the steps S306 to S309, respectively. Hence, the explanation of the steps S401 to S405 and the steps S407 to S410 in the flow chart of FIG. 11 is omitted.

In FIG. 11, in a case where it is judged that the absolute value |e| is greater than the allowable value in the step S404, the step S404 is followed by the step S405, where the cumulative $t_e$ is computed. In the following step S406, the opening command for the EGR valve is preserved. By preserving the opening command for the EGR valve in the step S406, the cause of the malfunction condition that the absolute value |e|, namely, the absolute value of the difference between the command value and the actual measured-value is greater than the allowable value can be identified. In other words, the cause can be attributed to a reason that the opening of the EGR valve stays unchanged or another reason that the response to the opening command is slow.

In this first mode of the present invention, by use of FIGS. 3 to 10, a case where the opening of the EGR control valve is nearly full-opened and the target opening of the EGR control valve is in the dead zone has been explained thus far. Also, in the other case where the opening of the EGR control valve is nearly full-closed and the target opening of the EGR control valve is not in the dead zone, namely, in the case where the parameter θ is greater than the parameter θ1, the target opening of the EGR control valve is changed.

In this event, the target opening of the EGR control valve is not in the dead zone; thus, the change of the EGR gas flow rate, the EGR ratio, the intake air flow rate, the oxygen excess ratio, the air excess ratio and so on is sensitive to the change of the opening of the EGR control valve; thus, when the EGR is performed, a small opening change of the EGR control valve influences the reduction of the harmful substances in the exhaust gas. Accordingly, by making a small change to the target opening of the EGR control valve and by confirming the effect of the small change on the reduction of the harmful substances in the exhaust gas, the malfunction of the EGR control valve can be detected.

FIG. 12 is a graph which shows the change of the target opening of the EGR control valve in response to elapsed time, under a condition that the target opening of the EGR control valve is near zero. In FIG. 12, the vertical axis denotes the target opening of the EGR control valve and the lateral axis denotes the elapsed time. As shown in FIG. 12, the target opening of the EGR control valve is minutely changed.

Figure 13:
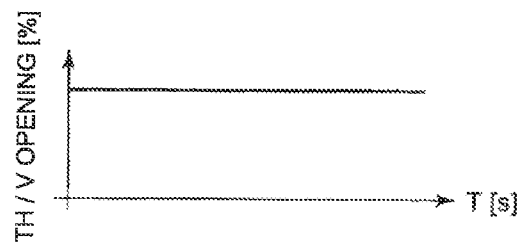
FIG. 13 is a graph which shows the change of the target opening of the throttle valve, under a condition that the target opening of the EGR control valve is near zero.

Further, FIG. 13 is a graph which shows the change of the target opening of the throttle valve, under a condition that the target opening of the EGR control valve is near zero. In FIG. 13, the vertical axis denotes the target opening of the throttle valve and the lateral axis denotes the elapsed time. As shown in FIG. 13, the target opening of the throttle valve stays unchanged.

As described above, in a case where the target opening of the EGR control valve is not in the dead zone, by minutely changing the target opening of the EGR control valve, the malfunction of the EGR control valve can be detected. Further, the sticking of the EGR control valve can be avoided. The sticking is attributable to the failure of the motor bearing, and the failure is caused by the condition in which the opening of the EGR control valve is kept at a same constant level for a certain prolonged duration of time.

In a case where the EGR control valve is minutely opened in a manner as described above, smoke may be generated. For all that, smoke is generally generated when the engine speed or the engine load is increased. When the engine is placed in a steady condition, the engine is not connected with the smoke generation. Further, by limiting the opening of the EGR control valve at most to the level of 4 to 8% of the full opening so as to constrain the effect of the flow rate, the problem of smoke generation can be avoided.

Further, in the EGR device provided with an EGR cooler as shown in FIG. 1, the EGR gas including smoke as well as unburned fuel is cooled when the EGR gas passes through the inside of the EGR cooler; and, the smoke is inclined to gradually become a soot deposit. Thereby, the unburned fuel plays the role of a binder of the deposit. In order to prevent the clogging of the EGR cooler, as well as, to prevent the drop in the cooling efficiency of the cooler, it is not performed to minutely change the target opening of the EGR control valve in a case where the target opening stays near 0 under a condition that the temperature of the EGR gas is low.

(Second Mode)

In a second mode of the present invention, the EGR device to which the EGR control valve is applied as well as the logic of the control thereby is the same as the EGR control valve as well as the logic of the control in the first mode. Hence, FIGS. 1 and 2 which are used in the first mode are also used in this second mode. And, the repetition of explanation is omitted.

In the second mode, the function 58 in FIG. 2 is provided with a hysteresis property. As for the function 58, the parameter θ is the independent variable which determines the opening of the EGR control valve as the dependent variable.

Figure 14:
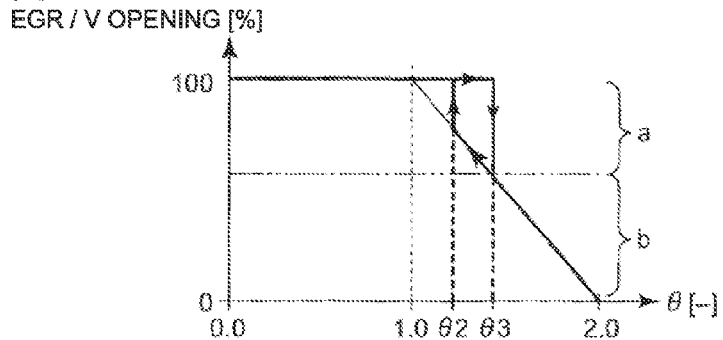
FIG. 14 shows an example of a function which determines the opening of the EGR control valve from a parameter θ in a second mode.

FIG. 14 shows an example of a function which determines the opening of the EGR control valve 24 from a parameter θ in a second mode; and, FIG. 14 corresponds to the function 58 in FIG. 2.

In FIG. 14, the vertical axis denotes the target opening of the EGR control valve and the lateral axis denotes the parameter θ. Further, the area expressed by a symbol 'a' corresponds to the dead zone of the EGR control valve opening; on the other hand, the area expressed by a symbol 'b' is an area in which the sensitivity to the EGR control valve opening change can be acknowledged. In this second mode, as shown in FIG. 14, the function 58 is provided with the hysteresis property in the range of θ from θ2 to θ3. And, the parameter θ3 is a coordinate of a boundary of the dead zone as is the case with the parameter θ1 in the upper drawing of FIG. 5 and the parameter θ3 is equal to the parameter θ1. In addition, the parameter θ2 is smaller than the parameter θ3.

Figure 15:
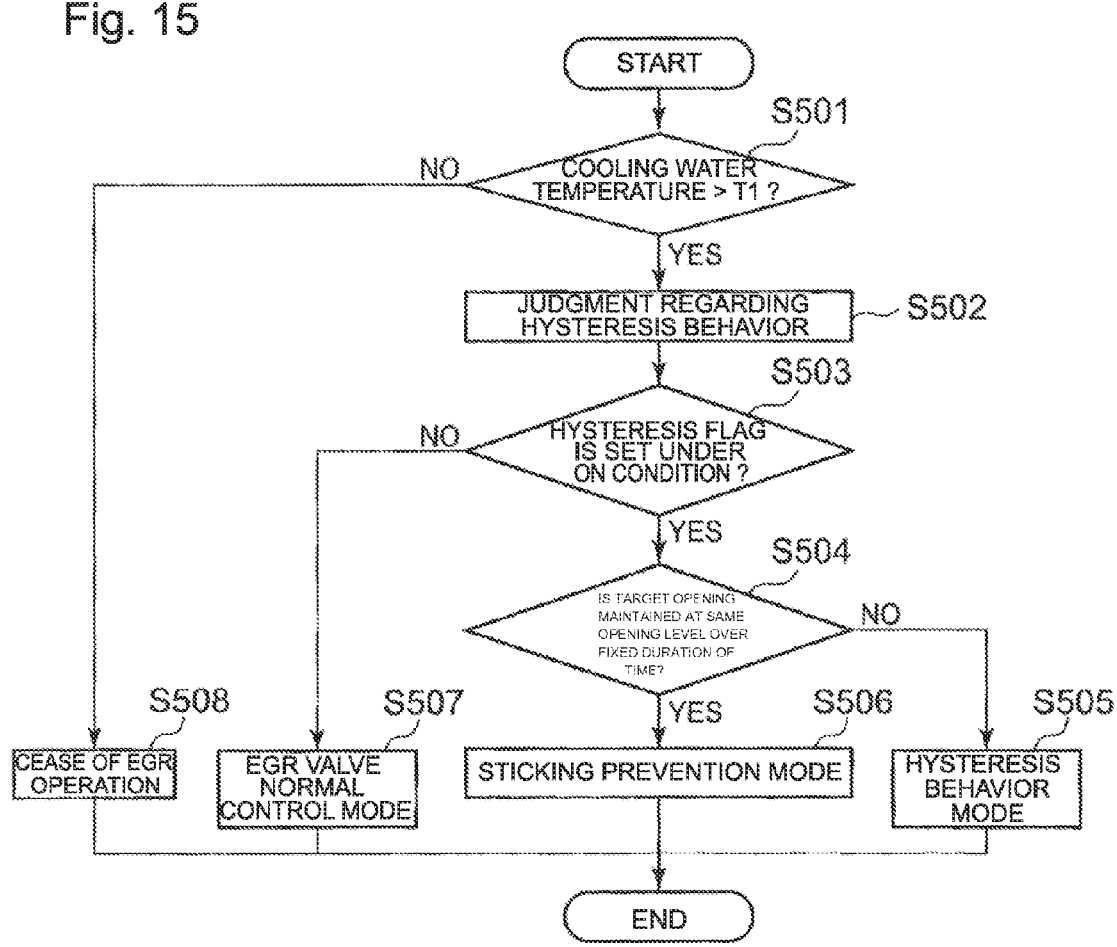
FIG. 15 is a flow chart which shows the control processes regarding the change of the target opening of the EGR control valve in the second mode.

As for the second mode, based on a flow chart as shown in FIG. 15, the control of the change of the EGR control valve target opening in a case where a function provided with the hysteresis property as shown in FIG. 14 is now explained.

FIG. 15 is the flow chart which shows the control processes regarding the change of the target opening of the EGR control valve in the second mode.

When the control flow is started, in the step S501, it is judged whether or not a cooling water temperature is higher than a temperature T1. When the result of the judgment in the step S501 is negative, namely, when it is judged that the cooling water temperature is not higher than the temperature T1, the step S501 is followed by the step S508, where the EGR is stopped so as not to perform the EGR operation; and, the control flow reaches an end. When the result of the judgment in the step S501 is affirmative, namely, when it is judged that the cooling water temperature is higher than the temperature T1 in the step S501, the step S501 is followed by the step S502.

In the step S502, a judgment as to a hysteresis behavior (a hysteresis judgment) is performed. The judgment as to the hysteresis behavior is performed according to a flow chart which is shown in FIG. 16.

Figure 16:
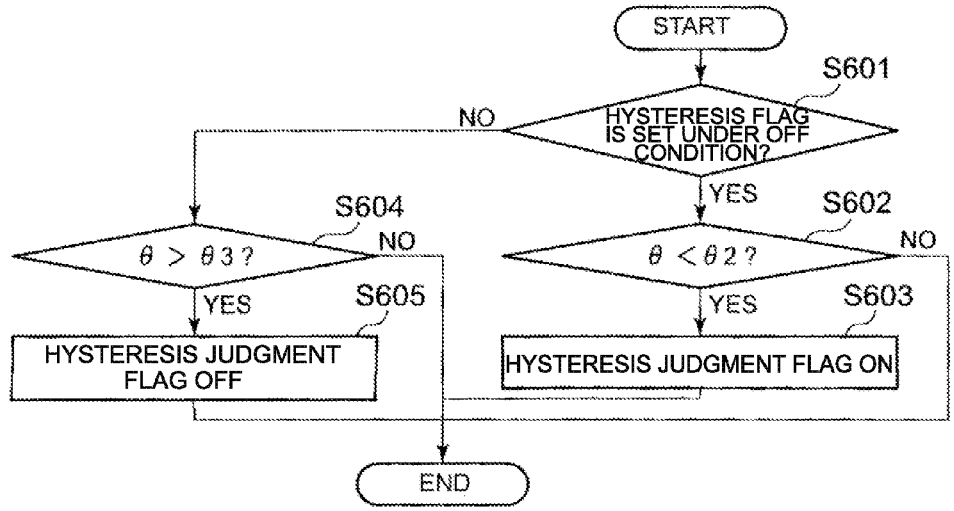
FIG. 16 is a flow chart which shows the processes regarding the judgment of a hysteresis behavior.

By use of FIG. 16, the judgment as to the hysteresis behavior is explained.

When the control flow is started, in the step S601, it is judged whether or not a hysteresis judgment flag is OFF. The hysteresis judgment flag is a flag by which it is determined, in the step S503 (FIG. 15) as described later, to perform an EGR valve normal-control-mode or to perform an EGR valve sticking prevention mode. And, the hysteresis judgment flag is a value dependent on the parameter θ.

When the judgment result in the step S601 is affirmative, namely, when it is judged that the hysteresis judgment flag is OFF, the step S601 is followed by the step S602.

In the step S602, it is judged whether or not the parameter θ which is issued by the logic as shown in FIG. 2 is smaller than the parameter θ2. When the judgment result in the step S602 is affirmative, namely, when it is judged that θ<θ2, the hysteresis judgment flag is changed to ON. And, the control flow reaches an end. When the judgment result in the step S602 is negative, namely, when it is judged that θ≥θ2, the hysteresis judgment flag is kept at OFF. And, the control flow reaches an end.

Further, when the judgment result in the step S602 is negative, namely, when the hysteresis judgment flag is ON, the step S601 is followed by the step S604.

In the step S604, it is judged whether or not the parameter θ is greater than the parameter θ3. When the judgment result in the step S602 is negative, namely, when it is judged that θ≤θ3, the hysteresis judgment flag is kept at ON without changing the flag condition.

According to the judgment as to the hysteresis behavior as shown in FIG. 16, regardless of the condition of the current hysteresis judgment flag, the hysteresis judgment flag is ON when θ<θ2, whereas the hysteresis judgment flag is OFF when θ>θ3. And, the control flow reaches an end. In addition, when θ2≤θ≤θ3, the current hysteresis judgment flag is preserved, and the control flow reaches an end.

When the hysteresis behavior judgment by the processes as shown in FIG. 16 are finished, the step S502 in FIG. 15 ends; then, the step S502 is followed by the step S503.

In the step S503, it is judged whether or not the hysteresis judgment flag is ON.

When the judgment result is negative, namely, when the hysteresis judgment flag is OFF, the step S503 is followed by the step S507, where the opening of the EGR control valve is controlled according to the opening command issued by the function 58 toward the EGR control valve without forcefully changing the target opening of the EGR control valve.

When the judgment result is affirmative, namely, when the hysteresis judgment flag is ON, the step S503 is followed by the step S504.

In the step S504, it is judged whether or not it is time to take a measure to prevent the sticking of the valve. As for the time to take a measure to prevent sticking, the explanation is the same as that in the step S104 of FIG. 8; hence, repetition of the explanation is omitted.

In the step S504, when the judgment result is affirmative, namely, when it is judged it is time to take a measure to prevent sticking, the step S504 is followed by the step S506, where the opening of the EGR control valve is controlled according to the EGR valve sticking prevention mode. And, the control flow reaches an end. In the EGR valve sticking prevention mode, as is explained by use of FIGS. 5 and 6 in relation to the first mode, the target opening of the EGR control valve is changed within a range in the dead zone. Further, according to a series of processes shown in the flow chart of FIG. 10 or 11, the judgment as to whether or not a malfunction of the EGR control valve is occurring is performed.

In the step S504, when the judgment result is negative, namely, when it is judged that it is not time to take a measure to prevent sticking, the step S504 is followed by the step S505, where the hysteresis behavior mode e is taken. And, the control flow reaches an end.

Figure 17:
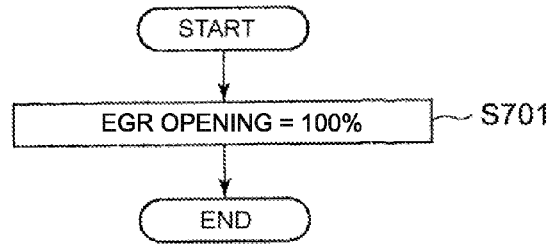
FIG. 17 is a flow chart which shows the processes in the hysteresis behavior mode.

Based on FIG. 17, the procedure in the hysteresis behavior mode is explained. FIG. 17 is a flow chart which shows the procedure in the hysteresis behavior mode.

When the control flow is started in FIG. 17, the step S701 is performed.

In the step S701, the opening of the EGR control valve is fixed at 100%. And, the control flow reaches an end. In addition, in this second mode, as shown in the step S701 of FIG. 17, the opening of the EGR control valve is fixed at 100% in the hysteresis behavior mode; however, if the opening in the dead zone, the opening of the EGR control valve can be fixed at a level other than 100%.

In other words, in the hysteresis behavior mode, the opening of the EGR control valve is maintained at a constant level in the dead zone. In a case where the hysteresis behavior mode is applied, the EGR control valve can be prevented from being frequently oscillated within the dead zone. In this way, troubles such as the wear of the seal of the valve shaft and the exhaust gas leakage from the seal part can be avoided.

Further, in the hysteresis behavior mode, since the opening of the EGR control valve is maintained at a constant level in the dead zone, the operation according to the hysteresis behavior mode does not influence the EGR gas flow rate, the intake air flow rate, the oxygen excess ratio, the air excess ratio and so on.

In the first and second modes as described above, the control of the EGR control valve has been explained; however, the device and the method as described above can be applicable to the throttle valve.

The present invention can be used as a control device and a control method of a control valve which is used for an intake air-gas system of an engine. A malfunction of the control valve used for the intake air-gas system can be detected even under the operation condition that the actual opening agrees with the target opening and the target opening is unchanged; and the control valve sticking attributable to a damage of the motor bearing can be prevented. The damage is caused by a lube-oil loss due to the condition that the opening of the EGR control valve is kept at a same constant level for a certain long duration of time.

The invention claimed is:

1. A control device comprising:
   a control valve used for an intake air-gas system of an engine, the control valve being
      an intake air throttle valve provided in the intake air-gas system of the engine and configured to control a flow rate of intake air to the engine, or
      an EGR valve provided in the intake air-gas system of the engine and configured to control a flow rate of EGR gas to the engine; and
   a control unit configured to determine a target opening of the control valve in response to the operation conditions of the engine, and to control an opening of the control valve so that the opening conforms with the target opening,
   wherein an opening range of the control valve includes, from a fully closed position to a fully opened position of the control valve, a zone where the flow rate of the intake air or the flow rate of the EGR gas is determined in accordance with the opening of the control valve, and a dead zone where the opening of the control valve is larger than that in the zone and where the flow rate of the intake air or the flow rate of the EGR gas is not influenced by the opening of the control valve even when the opening of the control valve is changed;
   wherein the control unit is configured so that, in a case where the target opening is maintained at a same level over a fixed duration in a range of the dead zone, the target opening is changed, in time, from the target opening which is determined in response to the operation conditions of the engine, and the opening of the control valve is controlled in order to avoid the control valve from being out of order; and
   wherein the control unit is further configured so that in a case where the target opening, which is changed in response to the operation conditions of the engine, is not maintained at a same opening level over the fixed duration in the range of the dead zone, the target opening is forcefully fixed at a constant level in the range of the dead zone.

2. The control according to claim 1, wherein, in changing the target opening over time,
   the control unit is configured to judge that the control valve is out of order, in a case where a time duration in which a difference between the target opening and an actual opening of the control valve exceeds a predetermined allowable level continues over a predetermined allowable duration of time.

3. The control device according to claim 2, wherein, in changing the target opening over time,
   the control unit is configured not to change the target opening but to maintain the target opening, in a case where the difference between the target opening and the actual opening of the control valve exceeds the predetermined allowable level.

4. The control device according to claim 1, wherein:
   the control unit is configured to hold a function representing a relationship between a parameter θ determined in response to the operation conditions of the engine and the target opening; and
   the function is configured to include a hysteresis element.

5. A control method for avoiding a control valve of an intake air-gas system of an engine from being out of order and detecting a failure of the control valve,
   an opening range of the control valve includes, from a fully closed position to a fully opened position of the control valve, a zone where a flow rate of intake air or a flow rate of EGR gas is determined in accordance with an opening of the control valve, and a dead zone where the opening of the control valve is larger than that in the zone and where the flow rate of the intake air or the flow rate of the EGR gas is not influenced by the opening of the control valve even when the opening of the control valve is changed,
   the method comprising the steps of:
   determining a target opening of the control valve used for an intake air-gas system in response to the operation conditions of the engine, the control valve being an intake air throttle valve to control the flow rate of intake air to the engine or an EGR valve to control the flow rate of EGR gas to the engine; and
   regulating the opening of the control valve so that the opening conforms with the target opening,
   wherein, in a case where the target opening is maintained at a same level over a fixed duration in time in a range of the dead zone,
   the method further comprises the steps of:
   changing the target opening, in time, from the target opening of the control valve in response to the operation conditions of the engine;
   and
   fixing the target opening forcefully at a constant level in a range of the dead zone in a case where the target opening, which is changed in response to the operation conditions of the engine, is not maintained at a same opening level over the fixed duration and the target opening is in the range of the dead zone.

6. The control method of the control valve used for the intake air-gas system of the engine according to claim 5, wherein, in changing the target opening, over time,
   it is judged that the control valve is out of order, in a case where a time duration in which a difference between the target opening and an actual opening of the control valve exceeds a predetermined allowable level continues over a predetermined allowable duration of time.

7. The control method of the control valve used for the intake air-gas system of the engine according to claim 6, wherein, in changing the target opening over time,
the target opening is not changed but maintained, in a case where the difference between the target opening and the actual opening of the control valve exceeds a predetermined allowable level.

8. A control device of a control valve used for an intake air-gas system of an engine, the device comprising:
the control valve which is an intake air throttle valve provided in the intake air-gas system of the engine to control the flow rate of intake air to the engine, or an EGR valve provided in the intake air-gas system of the engine to control the flow rate of EGR gas to the engine; and
a control unit which determines a target opening of the control valve in response to operation conditions of the engine, and controls the opening of the control valve so that the opening conforms with the target opening,
wherein an opening range of the control valve includes, from a fully closed position to a fully opened position of the control valve, a zone where the flow rate of the intake air or the flow rate of the EGR gas is determined in accordance with the opening of the control valve, and a dead zone where the opening of the control valve is larger than that in the zone and where the flow rate of the intake air or the flow rate of the EGR gas is not influenced by the opening of the control valve even when the opening of the control valve is changed,
wherein the control unit is configured so that, in a case where the target opening is maintained at a same level over a fixed duration in a range of the dead zone, the target opening is changed, in time, from the target opening, which is determined in response to the operation conditions of the engine, and the opening of the control valve is controlled in order to avoid the control valve from being out of order as well as in order to detect a failure of the control valve by judging the failure, in a case where a time duration in which the difference between the target opening and the actual opening of the control valve used for the intake air-gas system exceeds a predetermined allowable level continues over a predetermined allowable time duration, and
wherein the control unit is further configured so that in a case where the target opening, which is changed in response to the operation conditions of the engine, is not maintained at a same opening level over the fixed duration in the range of the dead zone, the target opening is forcefully fixed at a constant level in the range of the dead zone.

* * * * *